3,686,141
HETEROCYCLIZING OF POLYMER
William J. I. Bracke, Brussels, Belgium, assignor to Cosden Oil & Chemical Company, Big Spring, Tex.
Filed June 23, 1970, Ser. No. 49,009
Int. Cl. C08g 25/00, 33/00
U.S. Cl. 260—47 UP                               33 Claims

ABSTRACT OF THE DISCLOSURE

New heat resistant heterocyclized polybutadiynylenes of the formula

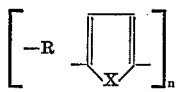

Figure 1:
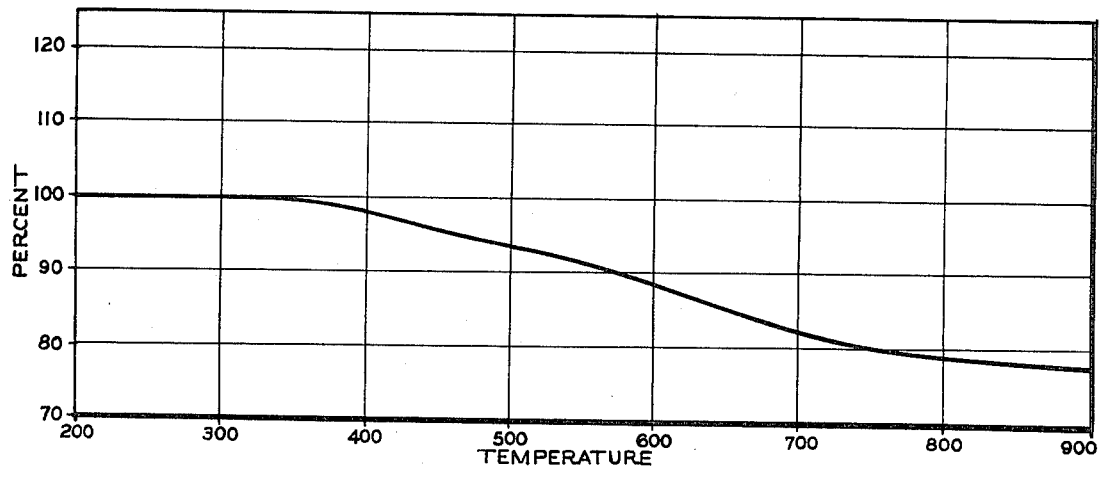

where R is organic and X is a heterocyclizing radical of the elements sulphur, selenium, tellurium, antimony, arsenic, bismuth, oxygen, phosphorus, boron, and nitrogen and which are formed by reacting polymers containing butadiynylene groups with a heterocyclizing compound of these elements having geminal atoms, and this method of making said polymers.

---

This invention relates to heterocyclized polydiynylenes and to a method for forming the same.

The heterocyclized polymers hereof comprise thermally stable polymeric heterocyclic ring compounds. The polymers may have a molecular weight ranging from about 1,000 up to about 30,000 or more, usually dependent upon the molecular weight of the starting material polymers containing butadiynylene $$(-C{\equiv}C-{\equiv}C-)$$

groups whose structure may be written as $$(-R-C{\equiv}C-C{\equiv}C-)_n$$

as defined below.

The heterocyclized compounds hereof are quite stable over a substantial temperature range. Where R is hydrocarbon or hydrocarbon heterocyclically bonded to one of the heterocyclizing elements listed below, the compounds are extra ordinarily stable even at very high temperatures and are formable into heat stable shaped polymers such as fiber, films, shaped bodies and coatings.

The polymers hereof have the chemical structure:

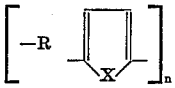
(I)

wherein R is a heat stable divalent organic group, preferably a hydrocarbon group such as an aliphatic, alicyclic, heterocyclic or aromatic hydrocarbon structure and X is a heterocyclizing radical of the elements of the group consisting of S, Se, Te, Sb, As, Bi, O, P, B and N, whereby the polymeric compounds comprise such compounds as polythiophenes, polypyrroles, polytellurophenes, polyselenophenes, polyborophenes, polyphospholes, and such polymeric compounds containing antimony, arsenic, and bismuth. The polydichlorothiophenes can be readily prepared from $SCl_2$. Compounds containing an X heterocyclizing radical have at least two geminal atoms such as hydrogen or halogen which are attached thereto. Where the heterocyclizing radical has a valence greater than two, then the extra valence may be occupied by an R' group or halogen, usually Cl, Br, or I, preferably Cl, where R' is a hydrogen or a monovalent hydrocarbon radical of the group aliphatic, heterocyclic, alicyclic, and aromatic.

The polymers of the present invention are prepared by heterocyclizing polymeric butadiynylenes with a heterocyclizing compound containing one of said heterocyclizing radicals with two geminal atoms bonded thereto. These polybutadiynylenes are first formed by oxidative coupling of corresponding diacetylene-substituted monomers of the structure H—C≡C—R—C≡C—H, where R is the stable divalent organic group defined above, in the presence of a copper salt or a copper Werner complex of an amine as known in the art; see United States Pat. 3,300,456, dated Jan. 24, 1967, which discloses the preparation of the 1–4 polybutadiynylene starting materials. The disclosure of this patent is here incorporated by reference.

In broad summary of that disclosure for present purposes, a diethynyl compound is oxidized to a polymeric polybutadiynylene group separated by R groups according to the following equation:

$$HC{\equiv}C-R-C{\equiv}CH \xrightarrow{O_2} (-C{\equiv}C-C{\equiv}C-R-)_n \quad (II)$$

In accordance with the present invention, such polymeric butadiynylene is then reacted with a heterocyclizing compound capable of forming a radical of the elements listed above, in a form such as hydrogen sulfide, ammonia, hydrogen, telluride, hydrogen selenide, hydrogen phosphide, $H_2O$, hydrogen boride, and the like, or in the form of their corresponding alkali or alkaline earth metal salts such as sodium sulfide, sodium phosphide, calcium phosphide, calcium sulfide, calcium selenide, or sodium telluride, and the liike; or in the form of their hydrides or partial hydrides such as sodium borohydride, calcium selenohydride, sodium hydrogen sulfide, antimony hydride, and the like; or in the form of their hydrocarbon or halogen-substituted compounds having at least two geminal valences unused or occupied by hydrogen or halogen, such as sulphur chloride, antimony trichloride, arsenic trichloride, bismuth trichloride, and the like, or a primary amine such as aniline, benzyl amine, cyclohexyl amine, oxygen or the like, according to the following equation:

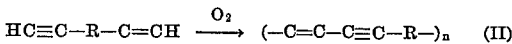
(I)

In a similar way, copolymers of the polyacetylenes may be formed by oxidation of mixed monomers to copolymeric polybutadiynylenes of the formula:

$$[-R''-C{\equiv}C-C{\equiv}C-R'''-C{\equiv}C-C{\equiv}C]_n \quad (III)$$

wherein R'' and R''' are two different heat stable divalent radicals of the formula R as defined above, preferably hydrocarbon radicals; or both R'' and R''' may be the same hydrocarbon radical R which may have the butadiynylene groups attached at different positions to comprise isomers of each other, and the copolymeric polybutadiynylene itself, thus formed, is then heterocyclized to a heterocyclic copolymer having the structure:

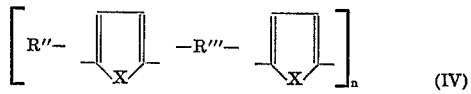
(IV)

For example, the starting material may be a mixture of both meta and paradiethynyl benzenes, whereby the final heterocyclized polymer is a copolymer of both para- and meta-substituted benzenes.

In a further copolymeric alternate, the polymer may be formed of mixed heterocyclic elements of the formula:

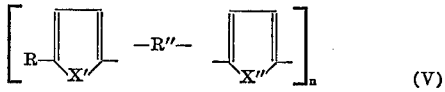
(V)

wherein the starting material is the same polybutadiynylene of the Formula II or III, but which was first only partially reacted with a heterocyclizing compound of the Formula X'', both X' and X'' being different heterocyclizing radicals of the Formula X. For example, the compound of Formula II or Formula III is first partially reacted with H₂S to heterocyclize a substantial number of the butadiynylene radicals to convert them to thiophene radicals and the reaction is then completed by continuing the reaction with ammonia to convert the remainder of the butadiynylene radicals to pyrrole groups, whereby the final polymer is a mixture of both thiophene and pyrrole groups bonded together by divalent R groups into a chain.

The divalent R group may also have one or more of its hydrogens substituted by radicals such as halogen,

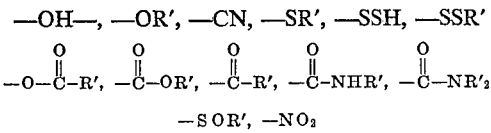

—SO₂R', —NHR' or —NR'₂. R' is a heat stable hydrocarbon or heterocyclic radical having up to about twelve carbon atoms.

Where, in the above Formula I, R is aliphatic, it may be a divalent alkylene, alkylidene, alkenylene or alkenylidene group of any radical chain length such as 1 to 30 carbon atoms, and may be straight or branched chain, the R group linking pairs of heterocyclic groups into the polymer structure of Formula I. Such aliphatic hydrocarbon radicals may be typically methylene, ethylene, propylene, isopropylene tetramethylene, isobutylene, 1,6-hexamethylene, decamethylene, tetraisopropylene, tetraisobutylene, 1,20-n-eicosene, 1,3-n-triacontene, vinylene, ethylidene, n-propylidene, propenylene, propenylidene, 1 hexyl 1,2-ethylene, and the like. Where the aliphatic compound bears a polar group, such radicals as polyethyleneoxy radical having 4 to 30 ethyleneoxy groups, 2-hydroxyethylidene, 2-aminoethylidene, 2-methoxyethylidene and 1-ethoxy-1,2-ethylene and the like are typical.

In Formula I, where R is aromatic, it is a linking of heterocyclic radicals to a divalent aromatic radical having one to three aromatic rings having at least two substitutable valencies such as o-, m-, or p-phenylene, tolylene, dimethyl phenylene, ethyl phenylene, diethyl phenylene, isopropyl phenylene, isobutyl phenylene, naphthylenes, 1-methylnaphthylenes, 1,4-dimethyl 5,8-naphthylene, biphenylene, divalent diphenyl ethylene, divalent diphenylene ethylidene, divalent o-ditolylene methane in which the open valencies are on the same or different arylene radicals linked together by the alkylene. Divalent radicals of compounds such as indene, Tetralin, anthracene, fluorene and phenanthrene, diphenyl oxide, diphenyl methane, ditolyl methane are also satisfactory. Where the aromatic R group is substituted by another hydrocarbon radical, it is usually lower alkyl having 1 to 10 carbon atoms and the aromatic ring may carry more than one hydrocarbon substituent but would not usually carry more than three substituents upon a phenylene ring.

Where the R group of Formula I is aromatic substituted with a polar radical, the divalent arylene radical is typically derived from benzonitrile, acetophenone, biphenylene oxide, nitrobenzene, methylbenzoic acid, phenylacetate, phenol and the like, the heterocyclic substituents of Formula I attaching at two unsubstituted positions of the aromatic ring.

Where the R group of Formula I is alicyclic, they are derived from compounds such as cyclohexane, cyclopentane, methylcyclopentane, ethylcyclopentane, methylcyclohexane, bicyclohexane and bicyclohexyl methane are typical. Such carbocyclic radicals can be further substituted by one to three hydrocarbon chains usually having from 1 to 10 carbon atoms such as methyl, ethyl, propyl, pentyl, isoamyl, 2-ethylhexyl, and the like. Where the alicyclic compound bears a polar group, such radicals as bicyclohexylene oxide, methylcyclohexyl ketone, methyl naphthenate, hydroxycyclohexane and the like are typical; and, again, the heterocyclic radicals attach to two unsubstituted ring positions.

Where the R group of Formula I is heterocyclic, it may be the thiophene, pyrrole, furane, pyridine and their fully hydrogenated analogs, and the like.

Preferably the R group of Formula I is monocarbocyclic arylene, alkarylene, bis-diarylene alkane or alkylene hydrocarbon in which the alkyl groups have 1 to 10 carbon atoms.

The polybutadiynylenes which provide a reactant for the formation of the polymers of the present invention shown in Formula I, as described in United States Patent 3,300,456, are formed by oxidation of a corresponding diacetylene compound of the formula

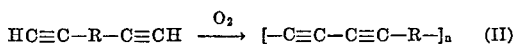

wherein R is as defined above. These polybutadiynylene polymers generally have a molecular weight exceeding about 1,000. Such polymers may vary from those having molecular weight of 1,000 to 30,000 and in which $n$ is at least 10 to those polymers having a molecular weight exceeding 30,000 where $n$ may be greater than 500, depending upon the initial oxidation procedure. However, the polybutadiynylene compounds formed are highly unstable. The heterocyclizing procedure hereof converts these very unstable polybutadiynylene compounds to very stable heterocyclic ring systems.

A typical reaction for heterocyclizing to form a thiophene ring is illustrated in the following equation:

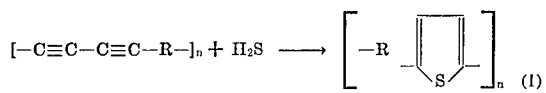

The reaction runs smoothly at room temperature by merely contacting the polymer with the H₂S such as by bubbling it through a solution of the polybutadiynylene starting polymer. Typical solvents that can be used usually have less than 12 carbon atoms and are alcohols, alkylamines, alkylethers, heterocyclic solvents such as pyridine and piperidine, lower alkyl formamides, hexamethyl phosphoramide (HMPA), lower alkyl ketones such as acetone and the like. The polybutadiynylene will also react without a solvent on direct exposure to the H₂S gas. It will also react in a heterogeneous system comprising an aqueous alkali or alkaline earth metal sulfide salt solution such as sodium sulfide, sodium hydrosulfide, calcium hydrosulfide and the like. The reaction rate may be accelerated somewhat by the presence of organic bases, typically lower alkyl amines, primary, secondary or tertiary, of which the alkyl has 1 to 4 carbon atoms, such as diethyl amine; but other amines that are aromatic or heterocyclic having a substantial basicity can be used. The reaction proceeds at room temperature in polar solvents or without a solvent, but higher temperatures up to about 175° do not appear to affect the reaction with H₂S. As stated, the reaction medium does not need to be homogeneous, but any liquid suspension of the polymer will react with H₂S bubbled through the liquid carrier whether or not the H₂S dissolves or whether or not the polymer dissolves in the medium, which in such cases serves merely to effect intimate contact of the reagents. The same reaction is similarly effected substituting sulfur chloride, hydrogen selenide, boron hydride (boroethane), hydrogen telluride, phosphine and the like for the H₂S, and the corresponding heterocyclized polymer in which the R groups are bonded together by corresponding chlorothiophene, selenophene, borophene, tellurophene and phosphole groups are obtained.

Reaction may also be run with ammonia, primary amines or phosphines to give corresponding pyrroles or phospholes, according to the following equation:

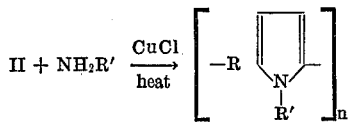

In general the R' radical of the heterocyclizing compound can be any monovalent organic radical of the structure R as defined above. The reaction of primary amines in this manner, usually, is catalyzed with cuprous salts. The reaction may be effected by using an excess of primary amine with a small catalytic amount of cuprous chloride, usually 1/10 to 2% of the amine by weight, with or without heating of the mixture, depending upon the nature of the amine. Where the R' group of the primary amine is alkyl having up to ten carbon atoms, the reaction will run at room temperature and where the R group is aryl, some heat, seldom above 175° C., is usually applied. The reaction product is the pyrrole bonded to the R' group of the particular primary amine used. The pyrroles in which the R' group is hydrocarbon are derived from the corresponding primary amine. The heterocyclized polymers formed from the amines generally are soluble in simple aromatic solvents such as benzene, chlorobenzene, nitrobenzene, aniline and the like.

The most useful heterocyclized polymers formed from an amine are those having the formula

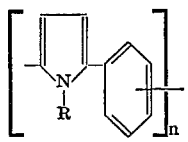

wherein the repeating units may be attached to the phenylene radical in either the meta or para position and wherein R is selected from the group consisting of aryl and alkyl radicals and substituted aryl and alkyl radicals, and wherein the R may be the same or different in the repeating units of the polymer. Particularly useful polymers of this formula are those wherein the substituents to the substituted aryl and alkyl radicals are from the group consisting of amine, hydroxyl, carboxyl, and aminophenyl groups.

Where the cuprous salt is used to catalyze the reaction, it is useful to effect the reaction in an inert atmosphere such as under a blanket of nitrogen, since the cuprous chloride is readily oxidized by air. Again, in the pyrrole forming reaction, polymers with molecular weights of in about the 30,000 molecular weight range are readily obtained.

The polymers formed in the heterocyclizing reactions hereof are linear. Mixed polymers can be formed by using a mixture of primary amines to form mixed pyrroles or even a mixed thiophene-pyrrole system can be formed. As indicated above, the mixed polymers are formed by first partially reacting the polybutadiynylene with one heterocyclizing compound, i.e., hydrogen sulfide, and completing the reaction with another heterocyclizing compound such as an amine or mixture of amines.

Typically useful starting compounds for preparing the polybutadiynylenes are o-, m- and p- isomeric diethynyl benzenes, diethylnyl toluenes, diethynyl xylenes, diethynyl ethylene, diethynyl diethylbenzene, diethynyl diphenylene oxide, diethynyl diphenylene polyalkylene oxide of 1 to 10 alkyleneoxy groups in which the alkylene has two or three carbon atoms, diethynyl tetramethylene, bis-p-diethynyl diphenylene oxide, bis-p,p'-diethynyl diphenylmethane, bis-p,p'-diethynyl diphenyl ethylidene, bis-p,p'-diethynyl diphenylene oxide and the like. Any diethynyl compound having an R group as identified above may be a useful starting material for oxidation to a conjugated polybutadiynylene useful for heterocyclizing according to the present invention.

Such polymeric butadiynylenes are soluble in numerous solvents such as benzene, toluene, xylenes, ethylbenzene; halogenated hydrocarbons such as dichlorobenzene, chlorobenzene, tetrachloroethane; ketones such as acetone, methylethyl ketone, n-methyl pyrrolidone, dimethyl pyrrolidone; esters such as methyl acetate; amides such as hexamethyl phosphoramide, acetamide, formamide, dimethyl acetamide; sulfolane®, ethers such as diethyl ether and the like, some of which, as set forth in the above referred to patent, deposit the polymer as amorphous solids.

The polymers of the present invention may be initially formed in the ultimately desired shapes or cut or machined to desired shape, but preferably the soluble forms of the polymer can be dissolved in or softened by a solvent and cast into films or extruded into shapes from which the solvent is evaporated; or the solution may be applied as a coating upon fiber or other support surfaces to form heat stable fibers, films and coatings.

The polybutadiynylene as stated may be heterocyclized by treatment in a heterogeneous system. For instance, the solid polymer either as free flowing solids or as coated in films upon a support body can be treated with vapors or solutions of the heterocyclizing compound, either form being contacted with the preformed polymer at moderate temperatures from ambient temperature to 250° C., preferably above 25° C. but below 175° C., with from 25 to 80° C. being preferred for forming the sulphur containing polymers and 100 to 160° C. being preferred for the nitrogen containing polymers. Alternately, the butadiynylene polymeric compound may be dissolved in a solvent in which the heterocyclizing compound may also be dissolved or suspended or with which it may be contacted in other ways. Thus the heterocyclizing reaction of the polydiacetylenic compound may take place in a homogeneous solution thereof in which the heterocyclizing compound may also be dissolved, or the reagents may be reacted by heterogeneous contact of vapors or immiscible solutions of the heterocyclizing agent. The insoluble vapor or immiscible solution of the heterocyclizing compound is passed into contact with a solution of the diacetylenic polymer; or the polymer may be contacted in its pure solid state with vapors or with a solution of the heterocyclizing agent in which the polymeric butadiynylene compound per se is insoluble. Thus the reaction of the heterocyclizing agent in the miscible or immiscible gaseous or liquid phases of the dissolved or deposited solid polybutadiynylene compound provides great flexibility for forming the heterocyclized polymer in a polymeric form or coating of deposited heat-stable solid in any shape desired.

As stated above, the polymers hereof are quite heat stable. Indeed, they are as stable as the divalent organic radical R. The most heat stable compounds are those wherein R is a divalent cyclic radical, both valencies being attached to the ring. Moreover, the heat stability in air will also vary with the oxidation resistance of the divalent radical R. For instance, where the polymer (R=benzene) is heated in air, it may withstand temperatures somewhat above 400° C., such as 475° C., before 50% of it is decomposed, which is remarkably good heat stability in air. However, where the product is heated in an inert gas, such as nitrogen, some compounds will exhibit much greater stability as set forth in Example I below.

In the preferred practice of the present invention, the heterocyclizing compounds employed for forming the polymers of the present invention are those capable of forming a divalent radical containing one of the elements selected from the group consisting of sulphur, nitrogen, oxygen, tellurium, selenium, boron and phosphorus. With respect to such divalent radicals which contain other substituents therein, it is preferred that such substituents be either hydrogen or a halogen selected from the group consisting of chlorine, bromine and iodine, preferably chlorine. The preferred heterocyclizing compounds employed in producing the polymers of the present invention are compounds of sulphur and nitrogen capable of forming a divalent sulphur or nitrogen containing radical. The substituents remaining in such divalent radical of nitrogen preferably is hydrogen and of sulphur, if any, preferably are hydrogen and/or chlorine. The most useful of the heterocyclizing compounds are $H_2S$ and $SCl_2$, preferably $H_2S$.

The most useful polymer reactants for forming preferred polymer compounds of the present invention are those polybutadiynylenes produced by oxidation of diacetylene compounds in accordance with the teachings of U.S. Pat. 3,300,456. In such oxidation reaction, the preferred diacetylene compounds employed as reactants are the diethynylaromatic compounds such as o-, m-, and p-diethynyl benzenes, diethynyl toluenes, diethynyl xylenes, diethynyl ethylbenzenes, diethynyl naphthalenes, diethynyl naphthalenes having one or more alkyl radicals of 1 to 3 carbon atoms substituted therein. Particularly preferred diacetylene compounds for forming the polymers of the present invention are the diethynyl aromatics in which the aromatic nucleus has no more than one substituent group other than the ethynyl groups with any such group having no more than 2 carbon atoms. The polymer reactant itself most often is one having a molecular weight within the range of 1,000 to 100,000, preferably 5,000 to 30,000.

The following examples illustrate the practice of this invention:

EXAMPLE I

One half gram of polymetaphenylene butadiynylene prepared as described in Example VII of United States Pat. 3,300,456, having a molecular weight of about 7,000, is dissolved in thirty milliliters of hexamethyl phosphoramide. The solution is flushed with nitrogen and saturated with $H_2S$ at room temperature. While maintaining a slow stream of $H_2S$, the solution is heated up to 50° C. and kept at this temperature for two hours. After that time the reaction is complete and excess $H_2S$ is flushed out with nitrogen. The polymer is precipitated in MeOH, filtered and dried at 180° C. under vacuum. The calculated composition for $C_{10}H_6S$, the repeating unit in accordance with Formula I is C, 75.91%; H, 3.83%; S, 20.26%. The found composition is C, 77.24%; H, 4.02%; and S, 19.1%. I.R. absorption is at 3050, 1600, 780 and 680 cm.$^{-1}$.

The polymer of this example was heated in an autoclave first with nitrogen circulating freely therein to provide an inert atmosphere and then comparatively with air circulated therein to provide an oxidizing atmosphere, at a heating rate in which the temperature was raised at a rate of 5° C. per minute at a pressure of 560 mm. Hg. The stability curve for this polymer was plotted, the weight percent of the original sample against the temperature.

As shown for the nitrogen autoclave of FIG. 1, the polymer did not begin to decompose until about 400° C.; was only 10% decomposed at about 575° C.; about 20% decomposed at 750° C.; and only about 22% decomposed at 900° C., indicating that this polymer has great heat stability in an inert atmosphere.

Figure 2:
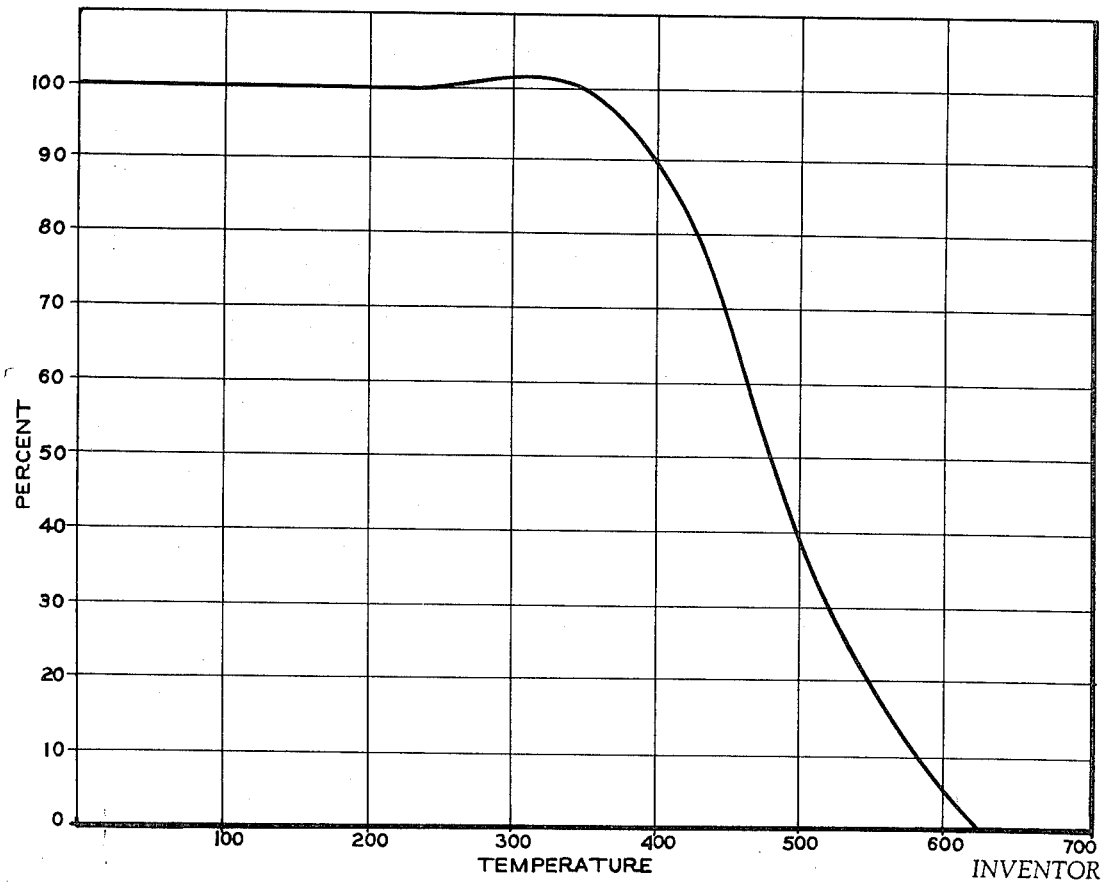

The results obtained when the same polymer is heated in air is shown in FIG. 2. This curve shows incipient oxidation at 300° C. (whereby the weight of the polymer slightly increased by the oxidation); and then began rapidly to decrease, beginning about 350° C. At 400° C. it was 10% decomposed; at 425° C. about 20% decomposed; and 60% decomposed at about 500° C. Nevertheless, it is clear that the polymer, even heated in air, has remarkably good heat and oxidation stability.

EXAMPLE II

One half gram of the copolymer formed by cupric amine oxidation of ten percent of paradiethynyl benzene, and ninety percent of metadiethynyl benzene having a molecular weight of about 25,000 and prepared according to Example IX of the United States Pat. 3,300,456, is dissolved in hexamethyl phosphoramide and the mixture is heated to 50° C. and $H_2S$ is introduced. Before the polymer begins to precipitate, the $H_2S$ stream is cut off and the polymer is cast into a film. The resulting tough film is suspended in a solution of one milliliter of tetramethylene diamine in thirty milliliters of dimethyl formamide. The system is heated to 50° C. and a slow stream of $H_2S$ is introduced. After twenty-four hours the reaction is complete and the film is washed with MeOH. The film produced is stronger and the reaction using a pretreated film is easier than the film formed from an untreated polymer sample. The product is poly[(2,5-thiendiyl)-1,3-phenylene]co[(2,5-thiendiyl)-1,4-phenylene].

EXAMPLE III

In a similar manner a copolymer formed of metadiethynyl benzene and 1,8-nonadiyne is treated with $H_2S$ as in Example II and a tough film is formed. It is somewhat less heat stable than the film of Example II.

EXAMPLE IV

A solution of 0.5 gram of polymetaphenylene butadiynylene in thirty milliliters of hexamethyl phosphoramide as an Example I is agitated vigorously with one gram solution of $Na_2S.9H_2O$ at room temperature for twelve hours. The heterocyclic polyethynyl benzene formed, as shown in Formula I where R is phenylene and X is sulphur, is precipitated from solution in water and washed with ethanol. The product has substantially the same composition as the product of Example I.

EXAMPLE V

Following the procedure of Example I but substituting polyparaphenylene butadiynylene formed as described in Example I above, and whose precipitation is described in detail in Example VIII of said United States Pat. 3,300,456, a polymer is formed. Such polymer may be formed as a thin film coating upon a fiber surface from the monomer first coated upon fiber glass. The polymeric film upon the fiber glass is then heterocyclized by contact with $H_2S$ gas for a period of ten hours.

EXAMPLE VI

Polymers of tetramethylene diyne (octadiyne) and p,p'-diacetylene diphenylene oxide as starting materials are first oxidatively polymerized as described in Example VII of United States Pat. 3,300,456, and then heterocyclized by treatment with hydrogen sulfide as in Example I above. The polymers are soluble in various solvents including specificially hexamethyl phosphoramide.

EXAMPLE VII

To a solution of one gram of the starting polymer of Example I in thirty milliliters of hexamethyl phosphoramide, two grams of $Na_2S.9H_2O$ is added. The mixture is vigorously shaken at room temperature for twelve hours. After the reaction has been completed, the polymer is then precipitated in MeOH and dried. A polymer of the same composition as that of Example VII and having a molecular weight of about 25,000 is obtained.

EXAMPLE VIII

One gram of the starting polymer of Example I in which [η] is 0.83 ([η] as used herein, is inherent viscosity), is mixed with 20 milliliters of aniline at room temperature. The system is carefully purged with nitrogen and 100 milligrams of CuCl is added. The reaction mixture is heated to 150° C. and kept at that temperature for two hours. For isolation, the polymer is precipitated in MeOH. The product is poly[(1-phenyl-2,5-pyrrolediyl)-1,3-phenylene]. The complete operation should be carried out under nitrogen to avoid the oxidation of excess aniline. [η] in chlorobenzene. 0.5 g./100 ml. at 30° C.: 0.33 dl./g. The molecular weight (determined by membrane osmometry) was 33,400.

Analysis.—Calculated (percent): C, 88.45; H, 5.11; N, 6.44. Found (percent): C, 85.45; H, 5.76; N, 7.36.

EXAMPLE IX

Twenty grams of p-aminodiphenyl ether are heated to 90° C. (just above the melting point) and one gram of polymer as defined in Example I is added. The mixture is carefully purged with nitrogen and 100 milligrams of CuCl is added. The reaction and isolation of the product is carried out as defined in Example VIII. The product is poly[(1-phenoxy phenyl-2,5-pyrrolediyl) - 1,3 - phenylene]. [η]-0.24 dl./g. The molecular weight was 24,000.

Analysis.—Calculated (percent): C, 85.41; H, 4.89; N, 4.52. Found (percent): C, 83.79; H, 5.57; N, 4.81.

EXAMPLE X

Fifteen grams of 1-naphthylamine and 0.5 gram of the starting polymer of Example I are melted together at 55° C. under nitrogen and 40 milligrams of CuCl are added. The system is heated to 150° C. for ninety minutes. The polymer is recovered by precipitation in MeOH. The product is poly[1-(1'-naphthyl) - 2,5 - pyrrolediyl]-1,3-phenylene.

EXAMPLE XI

Gaseous methylamine is dissolved in hexamethyl phosphoramide to a concentration of 7.5 grams per 100 milliliters (determined by titration). Twenty milliliters of this solution are mixed in a pressure bottle, with 0.5 gram of the polymer as described in Example I and 50 milligrams of CuCl. The flask is then purged with nitrogen, capped and heated at 130° C. for ninety minutes. The polymer was then isolated as described in Example I. The product is poly[(1-methyl-2,5-pyrrolediyl)-1,3-phenylene].

EXAMPLE XII

Twenty milliliters of benzylamine, one gram of the starting material of Example I and 100 milligrams of CuCl, are heated for two hours at 150° C. The polymer is isolated as described in Example I. The product is [(1-benzyl-2,5-pyrrolediyl)-1,3-phenylene]. The polymer product had an inherent viscosity of 0.11 and a molecular weight of 35,000.

Analysis.—Calculated (percent): 6.05. Found (percent): 6.30.

EXAMPLE XIII

Example I is substantially repeated with the exception that H₂O is substituted for H₂S as the heterocyclizing compound. The resulting polymer which forms, when subjected to the heat stability test described in Example I, is comparable in heat stability characteristics with that polymer formed in Example I.

EXAMPLE XIV

Example I is substantially repeated in a series of reactions which primarily differ from that described in Example I in that hydrogen selenide, phosphine, and selenium chloride are each substituted in one of such reactions in place of H₂S as the heterocyclizing compound. The polymers which form are found to possess good heat stability characteristics.

EXAMPLE XV

Example I is substantially repeated with the exception that sodium phosphide is substituted for H₂S as the heterocyclizing agent. The polymer which forms, when subjected to the heat stability tests of Example I, is comparable in heat stability characteristics with the polymer formed in Example I.

EXAMPLE XVI

Example I again is substantially repeated with the exception that arsenic hydride is substituted for H₂S as the heterocyclizing agent. The resulting polymer which forms, when subjected to the heat stability tests of Example I, is comparable in heat stability characteristics with that formed in Example I. In addition, such polymer possesses good resistance to burning.

As thus described, heat stable polymers are formed by treating a 1,3-conjugated polybutadiynylene compound as defined above, and which may be prepared as described in U.S. Pat. 3,300,456, by reacting the polymeric butadiynylene compound with a multi-valent heterocyclizing agent as defined above, the heterocyclizing agent having at least two replaceable hydrogens. The reaction is run at ambient to raised temperatures, usually below 250° C., with the reagents contacting each other in either a homogeneous or heterogeneous system. The heat stable polymers formed are usually solvent-soluble, and may be formed and handled in solutions or converted to useful solids in desired form from solutions or as disposed as coatings upon solids.

What is claimed is:

1. A polymeric heterocyclic compound having the formula

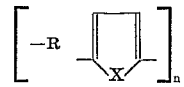

wherein R is a heat stable divalent organic radical, X is a divalent radical of an element selected from the group consisting of sulphur, selenium, tellurium, antimony, arsenic, bismuth, oxygen, phosphorous, boron and nitrogen, and wherein n is at least 10.

2. A polymeric heterocyclic compound having the formula

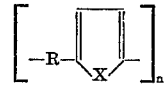

wherein R is a divalent organic radical of the group consisting of (1) aliphatic, alicyclic, heterocyclic and aromatic hydrocarbon radicals, (2) aliphatic, alicyclic, heterocyclic and aromatic radicals having a polar substituent of the group consisting of —OR, —OR", —CN, —SR", —SSH, —SRR", —SOR, —NO₂,

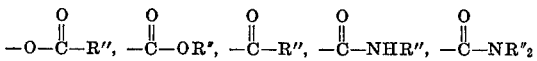

—NHR", —NR"₂ or —SO₂R" wherein R" is a heat stable monovalent organic radical of the structure R, and (3) a mixture of different divalent radicals of said groups (1) and (2) and wherein X is a divalent radical of an element selected from the group consisting of sulphur, selenium, tellurium, antimony, arsenic, bismuth, oxygen, phosphorous, boron, and nitrogen, and wherein X may be the same or different in the repeating units of said polymeric heterocyclic compound, and wherein n is at least 10.

3. The compound as defined in claim 2 wherein R is a divalent aliphatic hydrocarbon radical of the group consisting of alkylene, alkylidene, alkenylene and alkenylidene having one to thirty carbon atoms.

4. The compound as defined in claim 3 wherein said aliphatic hydrocarbon radical is selected from the group consisting of methylene, ethylene, propylene, isopropylene, tetramethylene, isobutylene, 1,6-hexamethylene, decamethylene, tetraisopropylene, tetraisobutylene, 1,20-n-eicosene, 1,3-n triacontene, vinylene, ethylidene, n-propylidene, propenylene, propenylidene and 1-hexyl-1,2-ethylene.

5. The compound as defined in claim 2 wherein R is a divalent aliphatic radical having a polar substituent selected from the group consisting of polyethyleneoxy radical having 4 to 30 ethyleneoxy groups, 2-hydroxyethylidene, 2-aminoethylidene, 2-methoxyethylidene and 1-ethoxy-1,2-ethylene.

6. The compound as defined in claim 2 wherein R is a divalent alicyclic hydrocarbon radical having up to three lower alkyl substituents thereon, said lower alkyl having one to ten carbon atoms.

7. The compound as defined in claim 6 wherein said alicyclic radical is selected from the group consisting of cyclohexane, cyclopentane, methylcyclopentane, ethylcyclopentane, methylcyclohexane, bicyclohexane, cyclohexene and bicylohexyl methane.

8. The compound as defined in claim 2 wherein R is a divalent alicyclic radical derived from the group consisting of bicyclohexlene oxide, methylcyclohexyl ketone, methylnaphthenate and hydroxcyclohexane.

9. The compound as defined in claim 2 wherein R is a divalent arylene hydrocarbon radical selected from the group consisting of arylene hydrocarbon radicals having 1 to 3 carbocyclic rings and arylene hydrocarbon radicals having up to three lower alkyl substituents thereon, said lower alkyl substituents having one to ten carbon atoms.

10. The compound as defined in claim 9 wherein said divalent arylene radical is selected from the group consisting of o-, m- and p-phenylene, tolylene, dimethyl phenylene, ethyl phenylene, diethyl phenylene, isopropyl phenylene, isobutyl phenylene, naphthylene, 1-methyl naphthylene, 1,4 - dimethyl - 5,8 - naphthylene, diphenyl methane, divalent diphenyl ethylene, divalent diphenylene ethylidene, and divalent o-ditolylene methane and divalent radicals derived from such compounds as indene, tetralin, anthracene, fluorene, phenanthrene, biphenyl.

11 The compound as defined in claim 2 wherein R is a divalent arylene radical having a polar substituent and is derived from the group consisting of benzonitrile, acetophenone, biphenylene oxide, nitrobenzene, methylbenzoic acid, phenylacetate and phenol.

12. The compound as defined in claim 2 wherein R is a phenylene radical.

13. The compound as defined in claim 2 wherein R is a phenylene radical and X is a sulphur radical.

14. The compound as defined in claim 2 wherein R is a phenylene radical and the heterocyclic radical is a divalent nitrogen containing radical.

15. A poly 2,5-thiendiyl-phenylene having the formula

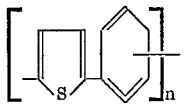

wherein the repeating units may be attached to the phenylene radical in either the meta or para positions and $n$ is at least 10.

16. A poly 2,5-pyrrolediyl phenylene having the formula

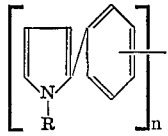

wherein the repeating units may be attached to the phenylene radical in either the meta or para position and wherein R is selected from the group consisting of aryl and alkyl radicals and substituted aryl and alkyl radicals wherein the substituent radical is a member of the group consisting of amine, hydroxyl, carboxyl and amino phenyl wherein $n$ is at least 10 and wherein the R may be the same or different in the repeating units of the polymer.

17. A poly 1-phenoxyphenyl-2,5-pyrrolediyl-phenylene having the formula of claim 16 wherein R is phenoxyphenyl.

18. A poly 1 - (1' - naphthyl)-2,5-pyrrolediyl-phenylene having the formula of claim 16 wherein R is naphthyl.

19. A poly 1-methyl-2,5-pyrrolediyl-phenylene having the formula of claim 16 wherein R is methyl.

20. A poly 1-benzyl-2,5-pyrrolediyl-phenylene having the formula of claim 16 wherein R is benzyl.

21. A poly 1-phenyl-2,5-pyrrolediyl-phenylene having the formula of claim 16 wherein the R is phenyl.

22. The compound as defined in claim 2 wherein the polymer is a copolymer having at least one repeating unit of the structure

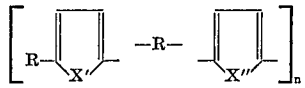

wherein the X' and X" are different radicals of the formula X.

23. The compound as defined in claim 22 wherein the X' radical is a divalent sulphur radical, and the X" radical is a divalent nitrogen radical.

24. The method of forming the polymeric heterocyclic compound of claim 1 comprising reacting a polybutadiynylene compound of the formula

[—C≡C—C≡C—R—]n wherein R and $n$ are as defined in claim 1, with a heterocyclizing compound capable of forming a divalent radical of an element selected from the group consisting of sulphur, selenium, tellurium, antimony, arsenic, bismuth, oxygen, phosphorous, boron, and nitrogen.

25. The method of claim 24 wherein said heterocyclizing compound is selected from the group consisting of $H_2S$, $H_2Se$, $H_2Te$, $H_3B$, $SCl_2$, $NH_3$, metal salts of S, Se, Te, P, B, and N, wherein said metal is a member of the group consisting of alkali and alkaline earth metals, and monovalent organic substituted compounds of the formula R'$PH_2$, R'$BH_2$ and R'$NH_2$ and R' is a heat stable monovalent organic radical of the structure R as defined in claim 1.

26. The method of forming a polymeric heterocyclic compound of the formula

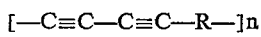

wherein R is a divalent organic radical of the group consisting of (1) aliphatic, alicyclic, heterocyclic, and aromatic hydrocarbon radicals, (2) aliphatic, alicyclic, heterocyclic and aromatic radicals having a polar substituent of the group consisting of —OH—, —OR", —CN, —SR", —SSH, —SSR", —SOR, —$NO_2$,

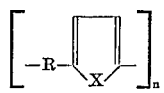

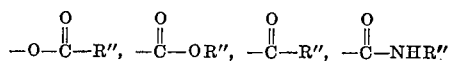

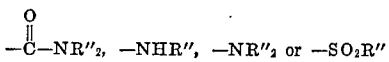

wherein R" is a heat stable monovalent organic radical of the structure R, and (3) a mixture of different divalent radicals of said groups (1) and (2) and wherein X is a divalent radical of an element selected from the group consisting of sulphur, selenium, tellurium, antimony, arsenic, bismuth, oxygen, phosphorous, boron, and nitrogen, and wherein X may be the same or different in the repeating units of said polymeric heterocyclic compound, and wherein $n$ is at least 10, said method comprising reacting a polybutadiynylene of the formula [—C≡C—C≡C—R—]n, wherein R and $n$ are as defined in claim 2 with a heterocyclizing compound selected from the group consisting of $H_2S$, $H_2Se$, $H_2Te$, $H_3P$, $H_3B$, $SCl_2$, ammonia, sulphur chloride, metal salts of S, Se, Te, P, B and N wherein said metal is a member of the group consisting of alkali and alkaline earth metals and monovalent organic substituted compounds of the formula R'''$PH_2$, R'''$BH_2$ and R'''$NH_2$ wherein R''' is a monovalent organic radical of the structure R.

27. The method of forming a polythienyl compound of the formula

wherein R is a divalent hydrocarbon organic radical selected from the group consisting of aliphatic, alicyclic and aromatic, X is sulphur and n is at least 10, comprising reacting a polybutadiynylene of the formula [—C≡C—C≡C—R—]n wherein R and n are as defined in this claim 27, with H$_2$S.

28. The method as defined in claim 27 wherein the R group is phenylene.

29. The method of forming a polychlorothienyl compound, each chlorothienyl group being bonded to a divalent hydrocarbon radical of the group consisting of aliphatic, alicyclic and aromatic, having the formula

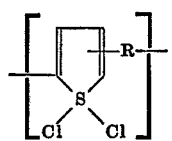

wherein n is at least 10, comprising reacting a polybutadiynylene of the formula [—C≡C—C≡C—R—]$_n$ wherein n is at least 10 and R is a repeating divalent hydrocarbon radical of the group consisting of aliphatic, alicyclic and aromatic, with SCl$_2$, R in repeating mer groups being attached to the thienyl group.

30. The method of forming a polypyrrolediyl compound of the formula

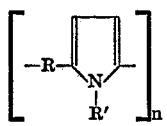

wherein R is a divalent hydrocarbon radical of the group consisting of aliphatic, alicyclic, and aromatic, and n is at least 10, comprising reacting a polybutadiynylene of the formula [—C≡C—C≡C—R—]n wherein R and n are as defined in this claim 30 with a primary amine of the formula R′ —NH$_2$ wherein R′ is a hydrocarbon radical of the group consisting of aliphatic, alicyclic and aromatic at a temperature in the range of 50 to 175° C. in the presence of a cuprous salt catalyst.

31. The method as defined in claim 30 wherein the R group is phenylene.

32. The method as defined in claim 30 wherein the radicals of the repeating polymer units are not the same in all such units and are different phenylene radicals, differing from each other as position isomers from which they attach to intermediate heterocyclic radicals.

33. The poly 2,5-pyrrolediyl-phenylene of claim 16 wherein said substituent to said substituent aryl and alkyl radicals is selected from the group consisting of amine, hydroxyl, carboxyl, and amino phenyl group.

References Cited

UNITED STATES PATENTS 3,300,456   1/1967   Hay _____ 260—88.2
3,519,611   7/1970   Hay _____ 260—94.1

FOREIGN PATENTS 1,202,796   10/1965   Germany.

OTHER REFERENCES

Schutle et al., Tetrahedron Lett. 1967, 4819–21.
Reische et al., Angew. Chem. 73, 241(1961).
Korshak et al., J. Polymer Sci., Pt. A 3, 2425–39(1965).

MELVIN GOLDSTEIN, Primary Examiner

U.S. Cl. X.R.

117—126 GB; 260—32.6 R, 32.6 N, 47 UA, 79.3 M, 79.5 C, 79.7, 80.3 R, 88.1 R, 88.2 S